(No Model.)
J. O'BRIEN.
MACHINE FOR CUTTING TEETH OF STONE CUTTERS' TOOLS.
No. 421,962. Patented Feb. 25, 1890.
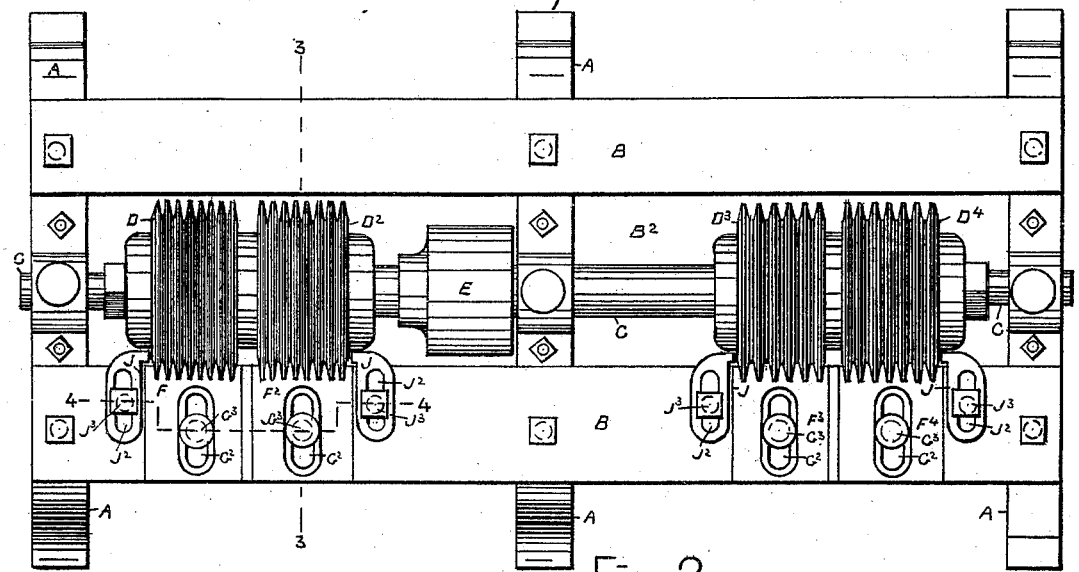
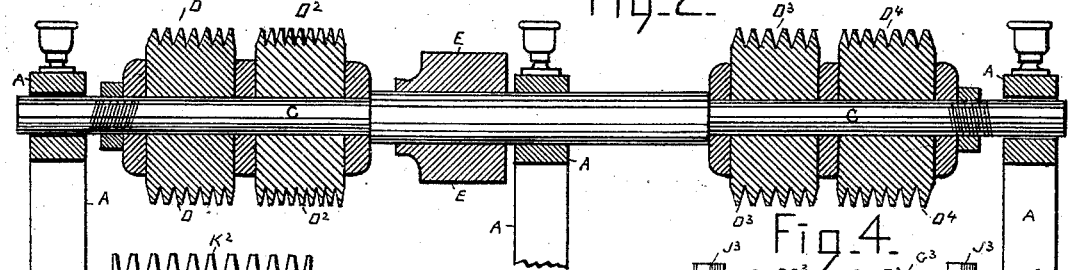
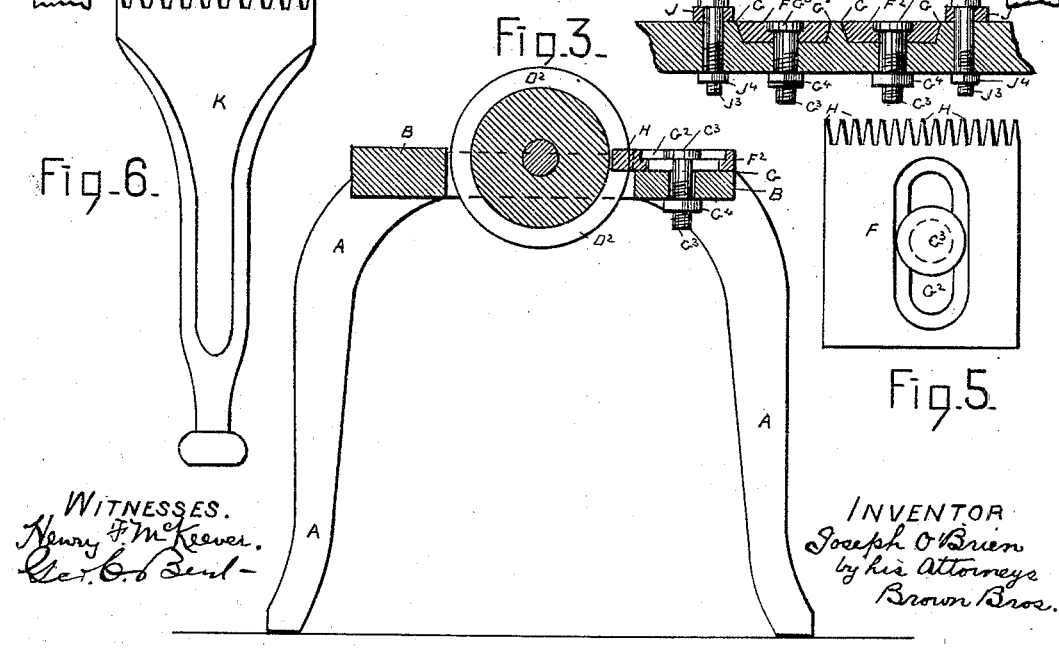
WITNESSES.
Henry F. McKeever.
Geo. C. ...
INVENTOR
Joseph O'Brien
by his Attorneys
Brown Bros.

UNITED STATES PATENT OFFICE.

JOSEPH O'BRIEN, OF BOSTON, MASSACHUSETTS, ASSIGNOR TO JEREMIAH CAREW, OF SAME PLACE.

MACHINE FOR CUTTING TEETH OF STONE-CUTTERS' TOOLS.

SPECIFICATION forming part of Letters Patent No. 421,962, dated February 25, 1890.

Application filed June 25, 1889. Serial No. 315,528. (No model.)

*To all whom it may concern:*

Be it known that I, JOSEPH O'BRIEN, a citizen of the United States of America, and a resident of the city of Boston, in the county of Suffolk and State of Massachusetts, have invented a certain new and useful Improved Machine for Cutting Teeth of Stone-Cutters' Tools, of which the following is a full, clear, and exact description.

This invention relates to stone-cutting chisels, particularly those technically known as "marteline" chisels, and which have a toothed cutting-edge, and it pertains to a machine for cutting the teeth of the tools.

The machine of this invention, in substance, is composed of a series of circular cutting-ribs held on a common horizontal shaft suitably supported and rotated, and a stationary horizontal die-plate held and supported at one side of and having at its edge toward said rotating cutting-ribs vertical ribs which enter into the open spaces between said cutting-ribs, and all so arranged that when the chisel is placed upon said die-plate with its edge to be toothed presented to said rotating cutting-ribs teeth will be cut in said edge by the operation of said cutting-ribs, substantially as hereinafter described.

Further than the above, the invention consists in certain improvements in detail for the better adjustment of the working parts of the machine and guidance or direction of the tool to be cut by its operation, all substantially as hereinafter described.

In the drawings forming part of this specification a machine (on a reduced scale) of this invention is illustrated, having a series or sets of rotating tooth-cutting ribs and companion vertical ribbed die-plates entering into the spaces between the cutting-ribs of each set.

Figure 1 is a plan view. Fig. 2 is a central longitudinal vertical section. Fig. 3 is a transverse vertical section, line 3 3, Fig. 1. Fig. 4 is a vertical section in detail, line 4 4, Fig. 1. Fig. 5 is a plan view of a die-plate of the machine enlarged. Fig. 6 is a side face view of a tool one-half full size.

In the drawings, A and A represent the supporting frame-work of the machine, consisting, essentially, of end uprights and an intermediate upright A A A and a horizontal table or platform B, which is supported by said uprights A and along its central portion $B^2$ is open.

C is a horizontal shaft supported and turning in suitable bearings of the uprights A and located in the open central portion $B^2$ of the table B. This shaft C at each of its opposite end portions and between the intermediate and end uprights A carries two sets of circular steel ribs (in all four sets) D $D^2$ $D^3$ $D^4$, which are severally held on the shaft C in any suitable manner, so as to rotate therewith. The several ribs of each set of ribs are uniformly separated, and each rib in cross-section and at all points of its circumference is of V shape, with the apex outermost, and both the side and the apex faces of the V are indented similar to the cutting or abrading faces of files, and thereby each rib is made suitable to cut metal, as will hereinafter appear in the description of the operation of the machine.

E is a pulley held on shaft C, and to be belted (not shown) for driving the shaft.

F $F^2$ $F^3$ $F^4$ are steel die-plates severally held on the table B at one side of the sets of cutting-ribs D $D^2$ $D^3$ $D^4$, and one at each set. Each die-plate is horizontal, and is received in a way G of and is flush with the table B, running across the table and at right angles to the axis of rotation of the cutting-ribs. Each die-plate has a central slot $G^2$, running lengthwise of the way G, and $G^3$ is a headed screw-threaded bolt passed through and engaged by its head with the slot $G^2$, and thence through the table to the under side thereof, where it receives a screw-threaded nut $G^4$, which, being screwed or set up against the under side of the table, fastens the die-plate firmly to the table in whatever position it may have been placed. Each die-plate at its vertical edge toward the cutting-ribs of the set thereof to which it belongs has a series of vertical ribs H, entering into the spaces between the separate cutting-ribs of the sets D $D^2$ $D^3$ $D^4$.

J is a guide or gage having a lengthwise slot $J^2$, and secured by screw-threaded bolts $J^3$ and nuts $J^4$ to the table.

A guide is provided for each set of circular cutting-ribs, and when adjusted it serves as a side rest and bearing for the chisel to guide it in its presentation to the cutting-ribs to be cut, as hereinafter appears.

A chisel K, having its edge $K^2$ (shown in Fig. 6 as having a series of teeth) uncut, is placed upon a die-plate of the machine described, with its edge $K^2$ toward the cutting-ribs suitable for the size of teeth desired, and at a bearing against the gage J, belonging to said ribs, on which, the ribs being under rotation, the tool is moved gradually toward the ribs, and thus said edge is by the abrading and cutting faces of the ribs cut with a series of teeth corresponding substantially in size to the open spaces between the ribs, and in depth either equal to or less than the depth of the cutting-ribs, according to the distance which the tool is fed forward, as described.

The die-plates, attached as described, can be readily adjusted in position and removed and replaced with others when so desired. Again, the cutting-ribs preferably are separate disks or plates bound in a set together on the driving-shaft C in any suitable manner—as, for instance, as shown; but they may be severally in one piece of metal.

Having thus described my invention, what I claim, and desire to secure by Letters Patent, is—

1. The combination of a series of circular ribs, each having a V-shaped edge with cutting or abrading faces and severally held on a common rotating and suitably-supported shaft, and a stationary die-plate supported at one side of and having ribs entering into the spaces between the cutting-edges of said circular ribs, substantially as described, for the purpose specified.

2. The combination of a series of circular ribs, each having a V-shaped edge with cutting or abrading faces and severally held on a common rotating and suitably-supported shaft, a stationary die-plate supported at one side of and having ribs entering into the spaces between the cutting-edges of said circular ribs, a slot $G^2$ of said die-plate, a headed screw-threaded bolt $G^3$, entered through and engaged by its head with said slot of the die-plate, and also passed through the die-plate support, and a screw-threaded nut $G^4$, screwed onto said bolt to bind the die-plate to and release it from its support, substantially as described, for the purposes specified.

3. The combination of a series of circular ribs, each having a V-shaped edge with cutting or abrading faces and severally held on a common rotating and suitably-supported shaft, and a stationary die-plate supported at one side of and having ribs entering into the spaces between the cutting-edges of said circular ribs, and an adjustable gage J, held on the support for said die-plate, substantially as described, for the purposes specified.

In testimony whereof I have hereunto set my hand in the presence of two subscribing witnesses.

JOSEPH O'BRIEN.

Witnesses:
ALBERT W. BROWN,
MARION E. BROWN.